US010802960B2

(12) United States Patent
Li et al.

(10) Patent No.: US 10,802,960 B2
(45) Date of Patent: Oct. 13, 2020

(54) FLASH MEDIUM ACCESS METHOD AND CONTROLLER

(71) Applicant: Huawei Technologies Co., Ltd., Shenzhen (CN)

(72) Inventors: Tao Li, Hangzhou (CN); Guanfeng Zhou, Hangzhou (CN); Sheng Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/289,139

(22) Filed: Feb. 28, 2019

(65) Prior Publication Data
US 2019/0196961 A1 Jun. 27, 2019

Related U.S. Application Data

(63) Continuation of application No. PCT/CN2016/097718, filed on Aug. 31, 2016.

(51) Int. Cl.
*G06F 13/00* (2006.01)
*G06F 12/02* (2006.01)
(Continued)

(52) U.S. Cl.
CPC ........ *G06F 12/0246* (2013.01); *G06F 12/063* (2013.01); *G06F 13/16* (2013.01);
(Continued)

(58) Field of Classification Search
CPC .......................... G06F 12/0246; G06F 12/063
See application file for complete search history.

(56) References Cited

U.S. PATENT DOCUMENTS

| 2009/0070748 A1 | 3/2009 | Lin et al. |
| 2010/0325346 A1 | 12/2010 | Huang |

(Continued)

FOREIGN PATENT DOCUMENTS

| CN | 1553327 A | 12/2004 |
| CN | 101082891 A | 12/2007 |

(Continued)

OTHER PUBLICATIONS

Foreign Communication From a Counterpart Application, European Application No. 16914604.0, Extended European Search Report dated Jun. 7, 2019, 9 pages.

(Continued)

*Primary Examiner* — Sean D Rossiter
(74) *Attorney, Agent, or Firm* — Conley Rose, P.C.

(57) ABSTRACT

A flash medium access method, including selecting, by a controller, a target function queue from N function queues according to a predefined rule, where the target function queue is a non-empty queue, a flash medium in which a die associated with the target function queue is located is in an idle state, obtaining a basic instruction from the target function queue, determining, according to preset queue mapping information, the die associated with the target function queue, where the controller is connected to at least one flash medium, and the queue mapping information indicates that the N function queues are in a one-to-one mapping relationship with the N dies, generating, according to a preset signal generation rule, a time sequence signal corresponding to the basic instruction, and sending the time sequence signal to the flash medium in which the associated die is located.

20 Claims, 10 Drawing Sheets

(51) Int. Cl.
G06F 13/16 (2006.01)
G06F 13/42 (2006.01)
G06F 12/06 (2006.01)

(52) U.S. Cl.
CPC ...... *G06F 13/1668* (2013.01); *G06F 13/1689* (2013.01); *G06F 13/1694* (2013.01); *G06F 13/4234* (2013.01); *G06F 2212/2022* (2013.01)

(56) References Cited

U.S. PATENT DOCUMENTS

| | | | |
|---|---|---|---|
| 2011/0078365 | A1 | 3/2011 | Lin |
| 2013/0019053 | A1* | 1/2013 | Somanache ............ G06F 13/16 711/103 |

FOREIGN PATENT DOCUMENTS

| | | | |
|---|---|---|---|
| CN | 101498994 | A | 8/2009 |
| CN | 102236625 | A | 11/2011 |
| CN | 102567257 | A | 7/2012 |
| CN | 104407997 | A | 3/2015 |
| EP | 2546755 | A2 | 1/2013 |
| WO | 2008138249 | A1 | 11/2008 |

OTHER PUBLICATIONS

Machine Translation and Abstract of Chinese Publication No. CN1553327, Dec. 8, 2004, 10 pages.
Machine Translation and Abstract of Chinese Publication No. CN101498994, Aug. 5, 2009, 16 pages.
Machine Translation and Abstract of Chinese Publication No. CN102236625, Nov. 9, 2011, 8 pages.
Machine Translation and Abstract of Chinese Publication No. CN102567257, Jul. 11, 2012, 9 pages.
Machine Translation and Abstract of Chinese Publication No. CN104407997, Mar. 11, 2015, 28 pages.
Foreign Communication From a Counterpart Application, Chinese Application No. 201680004002.5, Chinese Office Action dated Mar. 18, 2019, 7 pages.
Foreign Communication From a Counterpart Application, PCT Application No. PCT/CN2016/097718, English Translation of International Search Report dated Apr. 28, 2017, 2 pages.
Foreign Communication From a Counterpart Application, PCT Application No. PCT/CN2016/097718, English Translation of Written Opinion dated Apr. 28, 2017, 4 pages.

* cited by examiner

FLASH MEDIUM ACCESS METHOD AND CONTROLLER

CROSS-REFERENCE TO RELATED APPLICATIONS

This application is a continuation of International Patent Application No. PCT/CN2016/097718 filed on Aug. 31, 2016, which is hereby incorporated by reference in its entirety.

TECHNICAL FIELD

The present disclosure relates to the storage field, and in particular, to a flash medium access method and a controller.

BACKGROUND

A solid state drive (SSD) has been increasingly widely used due to advantages of a high access speed, high shock-proof performance, and the like. A main storage medium of the SSD is a flash medium, such as a NAND flash. One NAND flash is one device. One device may include one or more dies. One die may be divided into multiple planes. One plane may be divided into several blocks. One block is divided into multiple pages. A basic unit of a data read/write operation of the NAND flash is a page, and data is erased in units of blocks.

NAND flashes produced by different NAND flash manufacturers have different modes, speeds, commands, and protocols. NAND flashes that are produced by a same manufacturer in different crafts and different lots may be corresponding to different modes, speeds, commands, and protocols. An existing NAND flash controller controls a flash medium in a firmware form, and cannot be compatible with flash mediums of different types. In addition, an operation method of the NAND flash controller includes that after an operation instruction is received, the operation instruction is first divided into multiple basic instructions, and then the multiple basic instructions are successively sent to a flash medium, after the flash medium executes one basic instruction, the NAND flash controller sends a next basic instruction to the flash medium. Because of an execution time difference between different basic instructions, the controller wastes a long time in waiting for sending of a new instruction after a current instruction is executed by the flash medium. Consequently, low operation instruction execution efficiency is caused.

SUMMARY

This application discloses a flash medium access method and a controller, to improve operation instruction execution efficiency and to be compatible with different types of storage mediums.

A first aspect of this application provides a flash medium access method. A storage medium may be a NAND flash. A controller may be a NAND flash controller, and the controller may be located in a personal computer, a server, a disk array, or an SSD. N function queues may be set in a storage inside the controller, for example, in a register or a cache inside the controller. The function queue is used to store a basic instruction. The basic instruction is obtained by dividing an operation instruction sent by an upper-layer device of the controller. The upper-layer device may be an SSD controller. The controller is connected to at least one flash medium. Each of the at least one flash medium includes at least one die. A quantity of function queues in the controller is equal to a quantity of dies connected to the controller. That is, there are also N dies. The N function queues are in a one-to-one mapping relationship with the N dies. That is, one function queue corresponds to one unique die. The operation instruction indicates a logical operation that is sent by the SSD controller for the NAND flash, for example, a page read operation or a block erasure operation. The operation instruction needs to be executed by the NAND flash controller. When executing the operation instruction sent by the SSD controller, the NAND flash controller needs to perform a group of micro-operations. The micro-operations are basic instructions. The basic instruction may be directly executed by the controller. For example, the basic instruction is a block erasure operation, a data write operation, a write waiting operation, a status query operation, or the like.

The following describes a working principle of the controller. The controller selects a target function queue from N function queues according to a predefined rule. The selected target function queue is a non-empty queue and a flash medium in which a die associated with the target function queue is located is in an idle state. The non-empty queue indicates that the function queue stores at least one basic instruction. A method for detecting, by the controller, a status of the flash medium in which the die is located may be that the controller sends a dedicated status detection instruction to the flash medium in which the die is located, the flash medium can preferentially respond to the status detection instruction, and a status of the flash medium is returned in an extremely short time. In this way, the controller can detect the status of the flash medium in which the die is located. It should be noted that, if the flash medium includes multiple dies, when a flash medium in which at least one of the multiple dies is located is in an idle state, it indicates that the corresponding flash medium is in an idle state. A method for obtaining a quantity of basic instructions in the function queue by the controller may be the controller may maintain a record table, the record table stores an entry that indicates a current quantity of basic instructions in each of the N function queues, and when an enqueue operation or a dequeue operation is performed according to a basic instruction on a queue head of a specific function queue, the controller updates an entry that stores the function queue and that is in the record table. The controller obtains a basic instruction from the target function queue. The controller determines, according to preset queue mapping information, the die associated with the target function queue, and determines, according to a preset correspondence between a flash medium and a die, the flash medium in which the associated die is located. The controller generates, according to a preset signal generation rule, a time sequence signal corresponding to the basic instruction. The signal generation rule indicates a time sequence signal generation rule of the basic instruction, such as a quantity of output clock cycles, a sequence number of an output pin, or a level status of a pin in each clock cycle. The controller sends the time sequence signal to the flash medium in which the associated die is located. A communications protocol between the controller and the flash medium may be a Toggle (switch) protocol or the Open NAND Flash Interface (ONFI) protocol.

In the foregoing embodiment, when a controller selects a target function queue according to a predefined rule, the target function queue is a non-empty queue and a flash medium in which a die associated with the target function queue is located is in an idle state. In this way, different dies can parallelly execute basic instructions sent by the controller in order to improve operation instruction execution efficiency. In addition, a time sequence signal corresponding to a basic instruction is generated according to a preset signal generation rule. In this way, different types of flash mediums can be matched by configuring signal generation rules corresponding to the different types of flash mediums such that compatibility between the controller and the flash mediums is improved.

In a possible implementation, the method further includes the following implementation process.

The controller receives an operation instruction. A type of the operation instruction may be a read operation instruction or a write operation instruction, and the operation instruction carries an access address. The operation instruction may be formed by combining different types of basic instructions in different manners. The controller may divide the operation instruction into at least two basic instructions according to a preset division rule. The division rule may be that the division is performed according to a predefined mapping relationship between an operation instruction and a basic instruction. For example, the division rule may be, when the read operation instruction is a page read command, the read command may carry an identifier of the read command, the controller may obtain identifiers of three associated basic commands according to a prestored correspondence between an identifier of an operation command and an identifier of a basic instruction, and divide the page read command into three basic instructions according to the identifiers of the three basic commands. The three basic instructions are, read command sending, status register check, and read data transmission. Each basic command carries an identifier of the basic command. For another example, the division rule may be, when the write operation instruction is a page write command, the operation instruction may be divided into three basic instructions according to a prestored mapping relationship between an identifier of a page write command and an identifier of a basic instruction. The three basic instructions are: 1. block erasure, 2. status register check, 3. data transmission. Each basic instruction may carry an identifier of the basic instruction. In this embodiment, the division rule of the operation instruction is not limited to the foregoing examples. Any existing method may be used for division according to a requirement. The controller is connected to at least one flash medium. Each of the at least one flash medium includes at least one die. A quantity of dies connected to the controller is equal to a quantity N of function queues. Each of the N dies has a different address range. Because the N function queues are in a one-to-one mapping relationship with the N dies, each function queue corresponds to one address range. The controller determines an associated function queue from the N function queues according to an address range of the access address carried in the operation instruction. The controller places, in the associated function queue, the at least two basic instructions obtained after division. It should be noted that, when the controller places, in a function queue, a basic instruction obtained after division, the basic instruction may be sent according to a first in first out rule.

It should be noted that, in flash mediums of different manufacturers, an operation instruction may be divided using different methods. For example, when dividing a same operation instruction, different manufacturers obtain different types and quantities of basic instructions. A specific division rule is not limited in the present disclosure.

In the foregoing embodiment, an operation instruction is divided into multiple basic instructions, and a basic instruction obtained after division is placed in a corresponding function queue according to an access address such that basic instructions corresponding to different operation instructions are concurrently executed, concurrency of dies of flash mediums is improved, and an execution time is reduced.

In a possible implementation of the present disclosure, when the controller receives an operation instruction sent by the upper-layer device, the controller may cache the received operation instruction in a command queue. The command queue may be a first in first out queue, and the command queue functions as a buffer. The controller obtains one operation instruction from the command queue each time. The command queue may be set in a storage inside the controller or a storage outside the controller. This is not limited in this embodiment.

In a possible implementation, different identifiers are allocated to different types of basic instructions in advance. The identifier of the basic instruction is used to indicate identity of the basic instruction. After dividing the operation instruction, the controller may add the identifier to the basic instruction according to the identifier allocated to the basic instruction in advance. For example, the identifier of the basic instruction may be represented by a specified field in the basic instruction, and the controller may read the specified field in the basic instruction to determine the identifier of the basic instruction. The controller queries output sequence information and at least one type of pin level status information associated with the identifier of the basic instruction. The pin level status information indicates a level status of a specified pin in a clock cycle. The level status includes a high electrical level or a low electrical level. The specified pin is a control pin used for control signal transmission, and does not include a data pin used for data information transmission or an address pin used for address information transmission. Different pin level status information indicates different level statuses of specified pins. The output sequence information indicates an output sequence of the pin level status information. One type of pin level status information may repeatedly appear. The output sequence information may indicate a repeat condition by adding a field after the pin level status information. The controller generates a time sequence signal according to the at least one type of pin level status information and the output sequence information, and the controller sends, using a specified pin, the time sequence signal to the flash medium in which the associated die is located.

In the foregoing embodiment, a time sequence signal generation rule is indicated using multiple different types of pin level status information and output sequence information, and pin level status information corresponding to all clock cycles does not need to be stored such that redundancy is avoided, and occupied storage space is reduced.

In a possible implementation, different types of flash mediums have different signal time sequences. If the controller needs to be compatible with a specific type of flash medium, a configuration device needs to perform related configuration on the controller according to a feature of a signal time sequence of the flash medium. The configuration device may be a computer, a test platform, or another device. A configuration process may be, the configuration device obtains a time sequence signal corresponding to a basic instruction, and obtains a level status of a specified pin in each clock cycle, if level statuses that are indicated by two pieces of pin level status information and that are of specified pins in a clock cycle are the same, the two pieces of pin level status information are of a same type, statistics about quantities of different types of pin level status information in the time sequence signal are collected, an output sequence of the different types of pin level status information is determined, and output sequence information is generated. An identifier of the basic instruction is set, and the identifier of the basic instruction is bound to output sequence information and at least one type of pin level status information that are obtained by means of division, to generate a signal generation rule. The signal generation rule may be prestored in a storage inside the controller. For example, the storage includes a Writable Control Storage (WCS), a register, or a cache.

In the foregoing embodiment, a time sequence signal generation rule is indicated using multiple different types of pin level status information and output sequence information, and pin level status information corresponding to all clock cycles does not need to be stored such that redundancy is avoided, and occupied storage space is reduced.

In a possible implementation, that the controller generates, according to a preset signal generation rule, a time sequence signal corresponding to the basic instruction, and sends the time sequence signal to a flash medium in which the associated die is located includes that the controller obtains an identifier of the basic instruction, the controller queries, according to the preset signal generation rule, clock cycle quantity information and level status information associated with the identifier of the basic instruction, where the clock cycle quantity information indicates a quantity of to-be-output clock cycles, and the level status information indicates a level status of a specified pin in each of the to-be-output clock cycles, the controller generates the time sequence signal according to the clock cycle quantity information and the level status information, and the controller sends, using the specified pin, the time sequence signal to the flash medium in which the associated die is located.

In the foregoing embodiment, because each clock cycle corresponds to level status information in advance, a controller can quickly learn a level status of a specified pin in a current clock cycle by means of table lookup such that a complex calculation process is avoided, and a delay in time sequence signal generation is reduced.

In a possible implementation, before the controller receives the operation instruction, a configuration device needs to perform related configuration on the controller according to a feature of a time sequence signal of a flash medium. A configuration method includes configuring, by the configuration device, an identifier of the basic instruction, and saving, by the configuration device, the identifier of the basic instruction in a signal generation rule after binding the identifier of the basic instruction to clock cycle quantity information and level status information.

In the foregoing embodiment, a controller can quickly generate a time sequence signal according to preset clock cycle quantity information and level status information. The level status information indicates a level status of a specified pin in each clock cycle. In this way, during table lookup, the level status can be quickly queried such that a time for generating the time sequence signal is reduced.

In a possible implementation, that the controller determines, from the N function queues, a function queue associated with the access address includes that the controller is connected to at least one flash medium, and each of the at least one flash medium includes at least one die, a quantity of dies connected to the controller is equal to a quantity of function queues, the controller may prestore an address range of each of the N dies, the controller may obtain, from a storage, prestored respective corresponding address ranges of the N dies, the controller determines a target die according to the address range of the access address carried in the operation instruction, where the target die is one of the N dies, and the controller determines, according to the preset queue mapping information, a function queue associated with the target die.

In the foregoing embodiment, a controller determines a target die according to an address range of an access address carried in an operation instruction, and then determines, according to a mapping relationship between a die and a function queue, a function queue associated with the target die such that a basic instruction obtained by dividing the operation instruction accurately enters a specified function queue, and enqueue efficiency of the basic instruction is improved.

In a possible implementation, that the controller selects a target function queue from N function queues each time according to a predefined rule includes the following. Different priorities are preset for the N function queues. A method for selecting the target function queue from the N function queues by the controller is that the controller selects, in descending order of priorities, a non-empty function queue that is associated with a die located in an idle flash medium from the N function queues each time as the target function queue, or a method for selecting the target function queue from the N function queues by the controller is that the controller randomly selects a non-empty function queue associated with an idle die from the N function queues each time as the target function queue. Alternatively, different queue identifiers (also referred to as IDs) are preset for the N function queues, a queue ID is used to indicate identity of a function queue, and different function queues have different queue IDs. The controller selects, in ascending or descending order of queue IDs, a non-empty function queue associated with an idle die from the N function queues each time as the target function queue.

In the foregoing embodiment, according to the foregoing method for selecting a target function queue, operation instructions in function queues can be parallelly sent to flash mediums for execution, and a controller does not continually obtain an instruction from one function queue such that a waiting time of the controller can be reduced, and concurrency of multiple dies and execution efficiency of a basic instruction are improved.

A second aspect of this application provides a controller, including a queue selection module, an instruction obtaining module, a first determining module, a generation module, and a sending module.

The queue selection module is configured to select a target function queue from N function queues, where the target function queue is a non-empty queue, a flash medium in which a die associated with the target function queue is located is in an idle state, N is an integer greater than 1, each of the N function queues is used to store a basic instruction obtained by dividing an operation instruction, and the non-empty queue indicates that the function queue stores at least one basic instruction. The instruction obtaining module is configured to obtain a basic instruction from the target function queue. The first determining module is configured to determine, according to preset queue mapping information, the die associated with the target function queue, where the controller is connected to at least one flash medium, each of the at least one flash medium includes at least one die, a quantity of dies connected to the controller is equal to a quantity N of function queues, and the queue mapping information indicates that the N function queues are in a one-to-one mapping relationship with the N dies. The generation module is configured to generate, according to a preset signal generation rule, a time sequence signal corresponding to the basic instruction. The sending module is configured to send the time sequence signal to the flash medium in which the associated die is located. The signal generation rule is used to indicate a correspondence between a basic instruction and a waveform output on a specified pin.

In the foregoing embodiment, when a controller selects a target function queue according to a predefined rule, the target function queue is a non-empty queue and a flash medium in which a die associated with the target function queue is located is in an idle state. In this way, different dies can parallelly execute basic instructions sent by the controller in order to reduce an operation instruction execution time. In addition, a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

In a possible implementation, the generation module is further configured to obtain an identifier of the basic instruction, query output sequence information and at least one type of pin level status information associated with the identifier of the basic instruction, where the pin level status information indicates a level status of a specified pin in a clock cycle, the level status includes a high electrical level or a low electrical level, and the output sequence information indicates an output sequence of the at least one type of pin level status information, and generate the time sequence signal according to the at least one type of pin level status information and the output sequence information. The sending module sends, using the specified pin, the time sequence signal to the flash medium in which the associated die is located. The specified pin may be a control pin that is of the controller and that is used for control signal transmission, and does not include a data pin used for data transmission or an address pin used for address information transmission.

In the foregoing embodiment, an operation instruction is divided into multiple basic instructions, and a basic instruction obtained after division is placed in a corresponding function queue according to an access address such that basic instructions corresponding to different operation instructions are concurrently executed, concurrency of dies of flash mediums is improved, and an execution time is reduced.

In a possible implementation, the generation module is further configured to obtain an identifier of the basic instruction, where different types of basic instructions have different identifiers, and the identifier may be carried in a specified field of the basic instruction, query, according to the preset signal generation rule, clock cycle quantity information and level status information associated with the identifier of the basic instruction, where the clock cycle quantity information indicates a quantity of to-be-output clock cycles, and the level status information indicates a level status of a specified pin in each of the to-be-output clock cycles, and generate the time sequence signal according to the clock cycle quantity information and the level status information. The sending module sends, using the specified pin, the time sequence signal to the flash medium in which the associated die is located.

In the foregoing embodiment, a time sequence signal generation rule is indicated using multiple different types of pin level status information and output sequence information, and pin level status information corresponding to all clock cycles does not need to be stored such that redundancy is avoided, and occupied storage space is reduced.

In a possible implementation, the controller further includes a receiving module, a division module, a second determining module, and an instruction storage module.

The receiving module is configured to receive an operation instruction, where the operation instruction carries an access address.

The division module is configured to divide the operation instruction into at least two basic instructions.

The second determining module is configured to determine a function queue associated with the access address from the N function queues.

The instruction storage module is configured to place the at least two basic instructions in the associated function queue.

In the foregoing embodiment, an operation instruction is divided into multiple basic instructions, and a basic instruction obtained after division is placed in a corresponding function queue according to an access address such that basic instructions corresponding to different operation instructions are concurrently executed, concurrency of dies of flash mediums is improved, and an execution time is reduced.

In a possible implementation, the second determining module is further configured to obtain address ranges separately corresponding to the N dies, and determine a target die according to an address range of the access address, and determine, according to the queue mapping information, a function queue associated with the target die, where the target die is one of the N dies.

In the foregoing embodiment, a controller determines a target die according to an address range of an access address carried in an operation instruction, and then determines, according to a mapping relationship between a die and a function queue, a function queue associated with the target die such that a basic instruction obtained by dividing the operation instruction accurately enters a specified function queue, and enqueue efficiency of the basic instruction is improved.

In a possible implementation, the queue selection module is configured to select, in descending order of priorities, a non-empty function queue associated with an idle die from the N function queues each time as the target function queue, or randomly select a non-empty function queue associated with an idle die from the N function queues each time as the target function queue, or select, in ascending or descending order of queue IDs, a non-empty function queue associated with an idle die from the N function queues each time as the target function queue.

In the foregoing embodiment, according to the foregoing method for selecting a target function queue, a case in which a controller continually obtains instructions from one function queue because target function queues selected in two consecutive times are the same can be effectively avoided such that a waiting time of the controller can be reduced, concurrency of dies can be improved, and execution efficiency of a basic instruction can be improved.

A third aspect of this application provides a controller, including one or more processors, a storage, a bus system, and one or more programs, where the processors and the storage are connected using the bus system, and the one or more programs are stored in the storage, the one or more programs include an instruction, and when the instruction is executed by a terminal, the controller performs the method according to any one of the first aspect to the possible implementations of the first aspect.

A fourth aspect of this application provides a computer readable storage medium that stores one or more programs, where the one or more programs include an instruction, and when the instruction is executed by a controller, the controller performs the method according to any one of the first aspect and the first to the fifth possible implementations of the first aspect.

BRIEF DESCRIPTION OF DRAWINGS

To describe the technical solutions in some of the embodiments of the present disclosure more clearly, the following briefly describes the accompanying drawings describing some of the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

It should be noted that the terms used in the embodiments of the present disclosure are for the purpose of illustrating specific embodiments, and are not intended to limit the present disclosure. The terms "a" and "the" of singular forms used in the embodiments of the present disclosure and the appended claims are also intended to include plural forms, unless otherwise specified in the context clearly. It should also be understood that, the term "and/or" used in this specification indicates and includes any or all possible combinations of one or more associated listed items. In addition, in the specification, claims, and accompanying drawings of the present disclosure, the terms "first," "second," "third," "fourth," and so on are used to distinguish between different objects but are not used to describe a particular order. Moreover, the terms "include," "have," or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
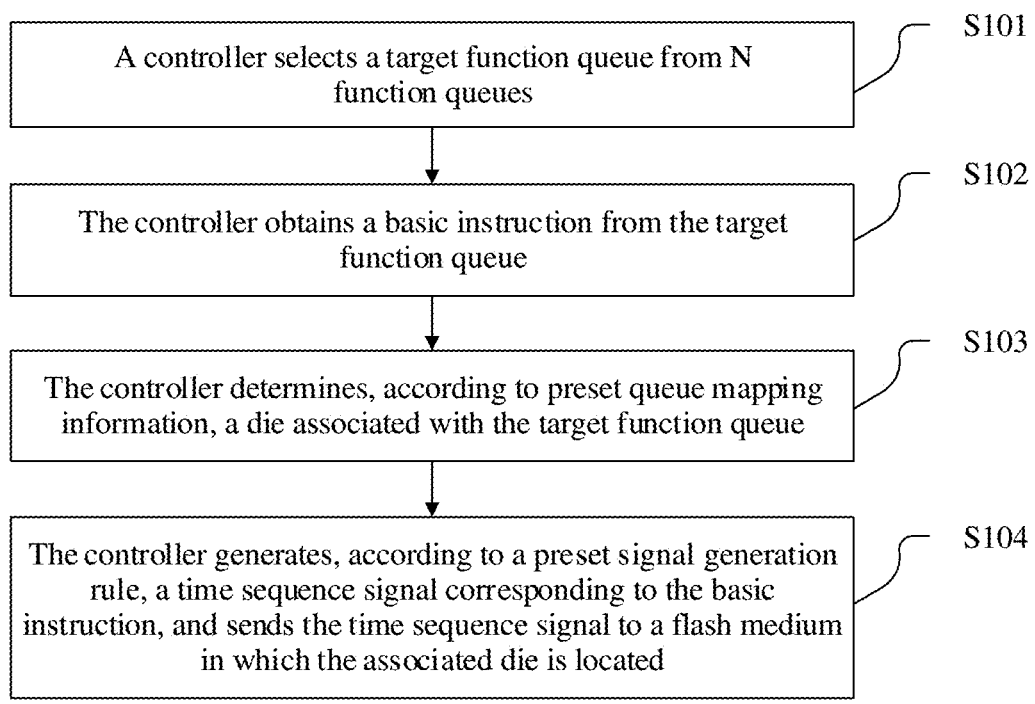
FIG. 1 is a schematic flowchart of a flash medium access method according to an embodiment of the present disclosure.

Referring to FIG. 1, FIG. 1 is a schematic flowchart of a flash medium access method according to an embodiment of the present disclosure. The method includes but is not limited to the following steps.

Step S101. A controller selects a target function queue from N function queues.

Further, the N function queues may be prestored in a storage inside the controller, for example, in a register or a cache of a memory of the controller. The controller is connected to at least one flash medium. Each of the at least one flash medium includes at least one die. A quantity of dies connected to the controller is equal to a quantity N of function queues. Each of the N queues is uniquely associated with one die. Queue mapping information indicating a one-to-one mapping relationship between the N queues and the N dies may be prestored in the storage inside the controller. In a possible implementation, when selecting the target function queue, the controller may first obtain non-empty function queues from the N queues by means of screening. Then, the controller obtains a status of a flash medium in which a die associated with each of remaining function queues is located, and removes a function queue associated with a die that is located in a busy flash medium. That is, a final remaining function queue meets two conditions, a non-empty queue, and associated with a die that is located in an idle flash medium. The controller selects, according to a predefined rule from function queues that meet the foregoing two conditions, one function queue as a current target function queue. Each of the N function queues may be a first in first out queue.

For example, the controller is connected to four flash mediums, and each flash medium includes two dies. Therefore, the four flash mediums include eight dies. The eight dies are a die 0, a die 1, a die 2, a die 3, a die 4, a die 5, a die 6, and a die 7, respectively. Eight function queues are preset on the controller. The eight function queues a function queue 0, a function queue 1, a function queue 2, a function queue 3, a function queue 4, a function queue 5, a function queue 6, and a function queue 7, respectively. The eight function queues are in a one-to-one mapping relationship with the eight dies. Each function queue corresponds to one unique die. The function queue 0 is associated with the die 0, the function queue 1 is associated with the die 1, . . . , and the function queue 7 is associated with the die 7. A process of selecting the target function queue by the controller may be as follows. The controller selects non-empty queues from the eight function queues, and it is assumed that the selected non-empty queues are the function queue 1, the function queue 2, the function queue 3, the function queue 5, and the function queue 6, then, the controller obtains statuses of flash mediums in which dies respectively associated with the five queues are located. Assuming that a flash medium in which the die 1 is located is in an idle state, a flash medium in which the die 2 is located is in an idle state, a flash medium in which the die 3 is located is in a busy state, a flash medium in which the die 4 is located is in a busy state, and a flash medium in which the die 5 is located is in a busy state, function queues finally obtained by the controller by means of screening are the function queue 1 and the function queue 2, and the controller selects one function queue from the foregoing two queues as the target function queue according to a predefined rule.

In a possible implementation of the present disclosure, the controller may maintain a record table. The record table may be stored in the register or the cache inside the controller.

The record table may be located outside the controller and be independent from the storage of the controller. The controller and the storage are located inside a storage device. The record table includes multiple entries used to record a quantity of basic instructions currently stored in a function queue. When a quantity of basic instructions in a function queue is updated (for example, a dequeue operation or an enqueue operation is performed), the controller updates an entry that corresponds to the function queue and that is in the record table. In this way, before selecting the target function queue, the controller may exclude an empty function queue according to the record table, and selects a non-empty function queue as the target function queue.

Step 102. The controller obtains a basic instruction from the target function queue.

Further, the target function queue may be a first in first out queue. The controller may obtain a basic instruction from a queue head of the target function queue. After detecting that a dequeue operation is performed according to the basic instruction in the target function queue, the controller updates an entry, in the record table, of the target function queue, and subtracts 1 from a value that is stored in the entry and that represents a quantity of basic instructions in the target function queue.

Step 103. The controller determines, according to preset queue mapping information, a die associated with the target function queue.

Step 104. The controller generates, according to a preset signal generation rule, a time sequence signal corresponding to the basic instruction, and sends the time sequence signal to a flash medium in which the associated die is located.

Further, the signal generation rule indicates a mapping relationship between a basic instruction and a time sequence signal generation rule. The time sequence signal generation rule indicates a rule of a waveform output on a specified pin of the controller. The controller generates, according to the preset signal generation rule, the time sequence signal corresponding to the basic instruction. The controller determines, according to a correspondence between a flash medium and a die, the flash medium in which the associated die is located. The controller sends the time sequence signal to the flash medium. If a type of the basic instruction is a read operation, the flash medium obtains a location of a to-be-read storage unit according to a level signal on an address pin, and under control of a level signal on a control pin, the flash medium sends data in the storage unit to a NAND flash controller using a data pin. If a type of the basic instruction is a write operation, the flash medium obtains a location of a to-be-written storage unit according to a level status of an address pin, and under control of a level signal input on a control pin, the flash medium writes to-be-written data on a data pin to the storage unit.

The following describes the storage medium access method using a specific embodiment. A controller is connected to one flash medium, and the flash medium includes three dies that are a die 0, a die 1, and a die 2, respectively. Three function queues are set inside the controller, and are a function queue 0, respectively, a function queue 1, and a function queue 2. There is a mapping between the function queue 0 and the die 0. There is a mapping between the function queue 1 and the die 1. There is a mapping between the function queue 2 and the die 2.

The function queue 0 currently stores three basic instructions, a basic instruction 00, a basic instruction 01, and a basic instruction 02, and the three basic instructions are obtained by the controller by dividing a received first operation instruction. The function queue 1 currently stores three basic instructions, a basic instruction 10, a basic instruction 11, and a basic instruction 12, and the three basic instructions are obtained by the controller by dividing a received second operation instruction. The function queue 2 currently stores three basic instructions, a basic instruction 20, a basic instruction 21, and a basic instruction 22, and the three basic instructions are obtained by the controller by dividing a received third operation instruction. When the controller sends a basic instruction for the first time, flash mediums in which all dies are located are in an idle state. The controller selects any function queue as a target function queue. It is assumed that the function queue 0 is first selected as the target function queue. The controller obtains the basic instruction 00 from the function queue 0, and sends the basic instruction 00 to the associated die 0, where the die 0 herein is in a busy state. Then, the controller selects a target function queue again, and the target function queue meets conditions that the target function queue is a non-empty queue and a flash medium in which a die associated with the queue is located is in an idle state. In this case, function queues that meet the conditions are the function queue 1 and the function queue 2. The controller selects either of the foregoing two function queues as the target function queue. It is assumed that the function queue 1 is selected as the target function queue. The controller selects a basic instruction on a queue head from the function queue 1 and sends the basic instruction to the associated die 1. Then, the controller selects a target function queue again. Because the die 0 may have probably executed the basic instruction 00 in this case and is in an idle state, function queues that meet the conditions may be the function queue 0 and the function queue 2. The controller selects either of the foregoing two queues as the target function queue. Assuming that the function queue 2 is selected as the target function queue, the controller sends a basic instruction on a queue head of the function queue 2 to the associated die 2. In this way, in a process in which one die executes an instruction, the controller may send a next instruction to another die before the instruction of the die is executed such that multiple dies can parallelly execute instructions in order to improve operation instruction execution efficiency.

In the foregoing embodiment, a controller selects, according to a predefined rule, a target function queue that is a non-empty queue and is associated with a die that is located in an idle flash medium. Because each function queue corresponds to a different die, different dies can parallelly execute basic instructions sent by the controller in order to improve operation instruction execution efficiency. In addition, a waveform of a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

Figure 2A:
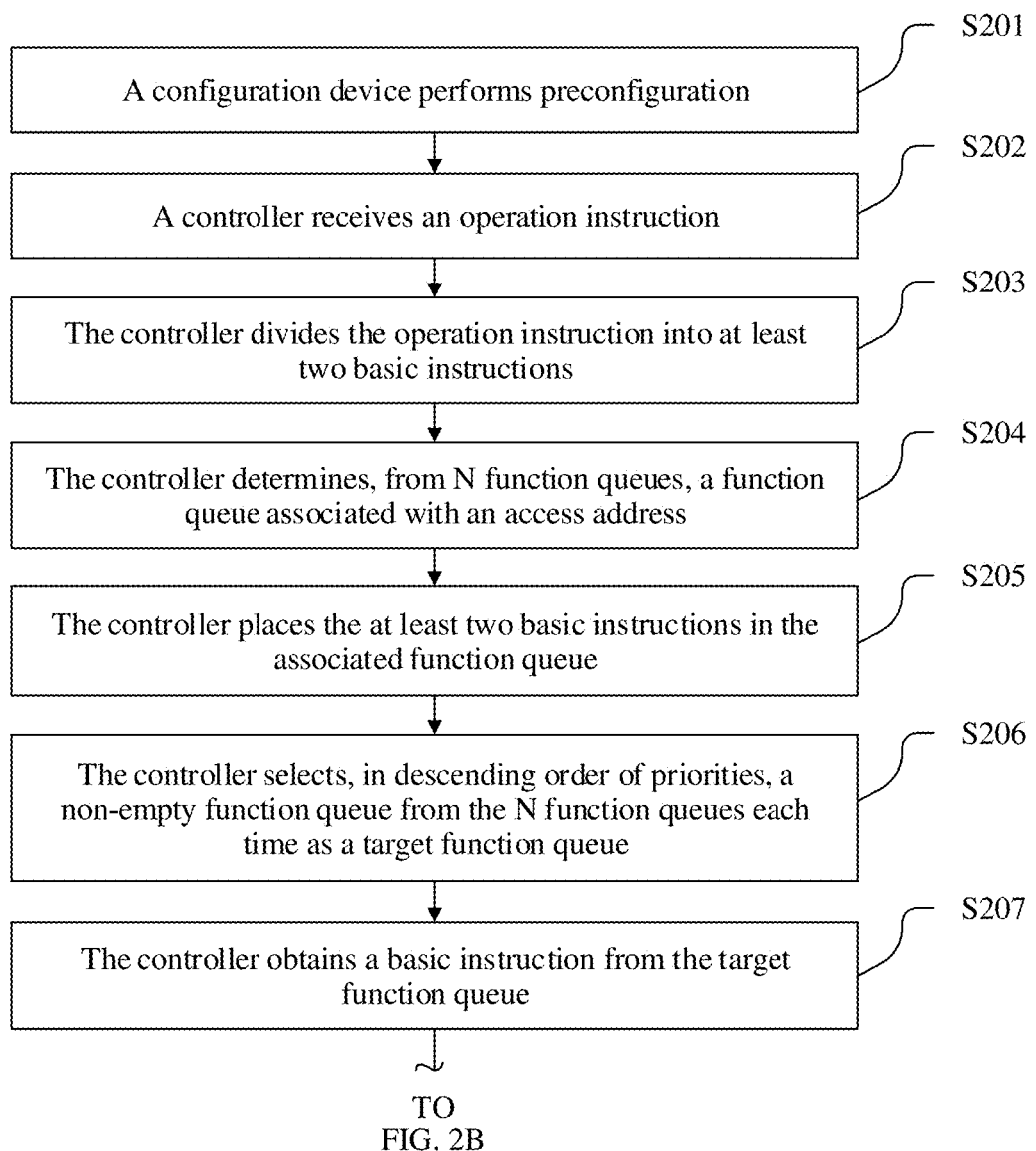
FIG. 2A and FIG. 2B are a schematic flowchart of another flash medium access method according to an embodiment of the present disclosure.
Figure 2B:
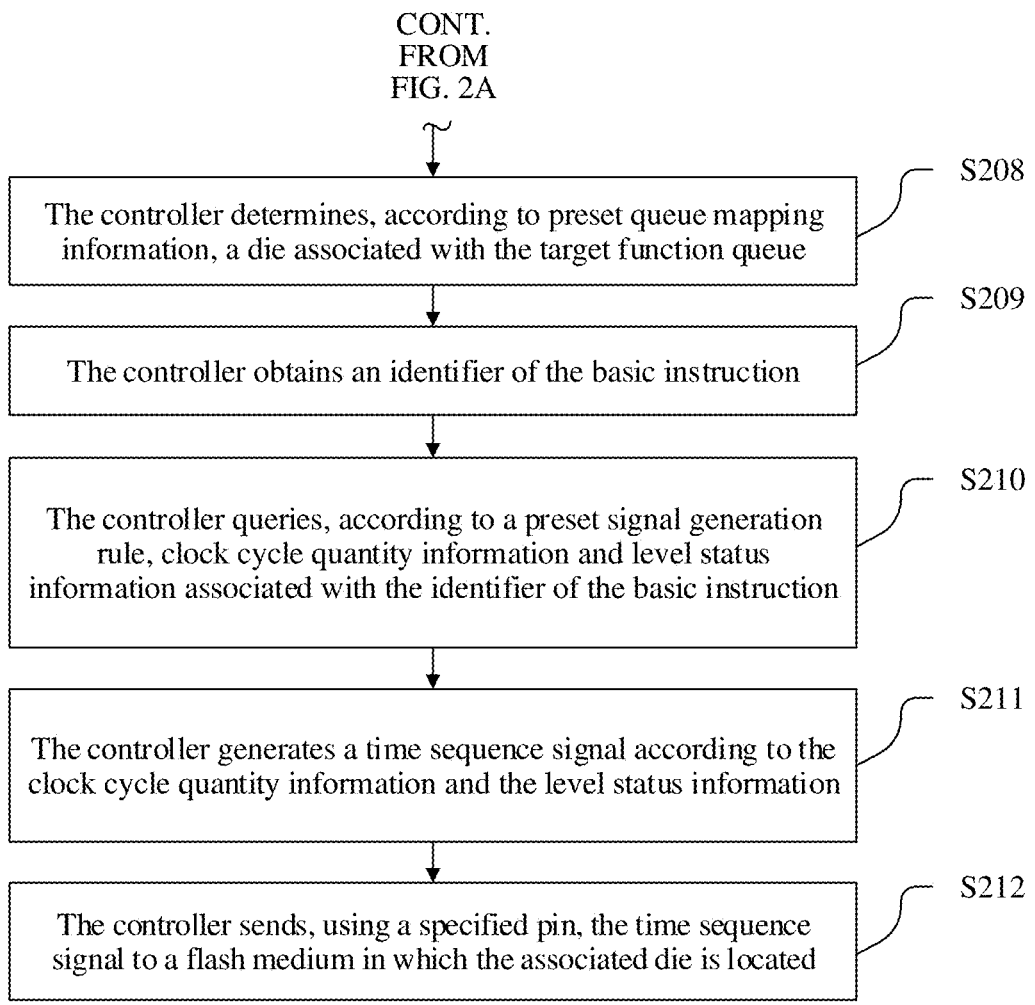

Referring to FIG. 2A and FIG. 2B, FIG. 2A and FIG. 2B are a schematic flowchart of a flash medium access method according to an embodiment of the present disclosure. The method includes but is not limited to the following steps.

Step S201. A configuration device performs preconfiguration.

Further, the configuration device performs related preconfiguration on a controller such that the controller is compatible with a connected flash medium. The configuration device may be a computer, a test host, a workstation, a server, or the like. The configuration device may generate a configuration file after completing configuration according to a type of a storage medium. The configuration device may burn the configuration file to a high-speed storage using a programmer. The high-speed storage may be a readable storage in a flash chip. The configuration device determines a quantity M of flash mediums that need to be connected to the controller. Each of the M flash mediums includes at least one die. The configuration device determines that a quantity of dies included in the M flash mediums is N. M and N are integers greater than 0. For example, the M flash mediums may be flash mediums of a same type. The same type indicates that the flash mediums have a same pin and a same time sequence signal format. Information that needs to be preconfigured by the configuration device includes but is not limited to the following.

1. The configuration device configures a quantity N of function queues according to the quantity N of dies included in the M flash mediums.

2. The configuration device obtains a mapping relationship between the M flash mediums and the N dies, and generates flash mapping information.

3. The configuration device configures a one-to-one mapping relationship between the N function queues and the N dies, and generates queue mapping information.

4. The configuration device configures a division rule for each operation instruction of all operation instructions. The division rule may indicate a correspondence between an identifier of an operation instruction and an identifier of a basic instruction. The configuration device allocates an identifier to each type of basic instruction and allocates an identifier to each type of operation instruction in advance.

5. The configuration device configures a time sequence signal generation rule corresponding to each type of basic instruction. Configuring the signal generation rule includes the configuration device sets an identifier of a basic instruction, the configuration device saves the identifier of the basic instruction, clock cycle quantity information, and level status information to form the signal generation rule, or the configuration device sets an identifier of a basic instruction, and binds the identifier of the basic instruction to output sequence information and at least one type of pin level status information that are obtained by means of division, to generate the signal generation rule.

The configuration device writes, to a storage, a configuration file including configuration information 1 to 5 (including 1 and 5). The storage may be a register or a cache inside the controller. The storage may be independent from the controller, and the controller and the storage are located inside a storage device.

For example, the controller is connected to two flash mediums, and each flash medium includes two dies. Therefore, a total quantity of dies connected to the controller is 4. A mapping relationship that is between a flash medium and a die and that is configured by the configuration device is as follows:

TABLE 1

| Flash 0 | Die 0 |
|---|---|
| | Die 1 |
| Flash 1 | Die 2 |
| | Die 3 |

The configuration device configures four function queues according to the quantity of dies. Queue mapping information configured by an external device is shown in Table 2:

TABLE 2

| Function queue 0 | Die 0 |
|---|---|
| Function queue 1 | Die 1 |
| Function queue 2 | Die 2 |
| Function queue 3 | Die 3 |

It should be noted that the foregoing example is merely for illustrative description. A quantity of flash mediums connected to the controller, a quantity of dies included in a flash medium, a mapping relationship between a flash medium and a die, and a mapping relationship between a function queue and a die are not limited thereto herein, and may be configured according to a requirement.

Step 202. A controller receives an operation instruction.

Further, the operation instruction may be sent by an upper-layer device. The upper-layer device may be an SSD controller. The operation instruction carries an access address. Both a read operation and a write operation are performed in units of pages. In the read operation, a page in any location may be randomly read, and in the write operation, write can be performed only according to a page sequence.

Step 203. The controller divides the operation instruction into at least two basic instructions.

Further, the controller may prestore a mapping relationship between an identifier of an operation instruction and an identifier of a basic instruction. After receiving an operation instruction, the controller may query, according to the mapping relationship, identifiers that are respectively corresponding to multiple basic instructions and that are associated with an identifier of the operation instruction, and divides the received operation instruction into multiple basic instructions. A format for carrying the basic instruction in the operation instruction may be a message. The controller divides the operation instruction into the multiple basic instructions, and adds, to the basic instructions, the identifiers queried according to the mapping relationship.

Figure 3:
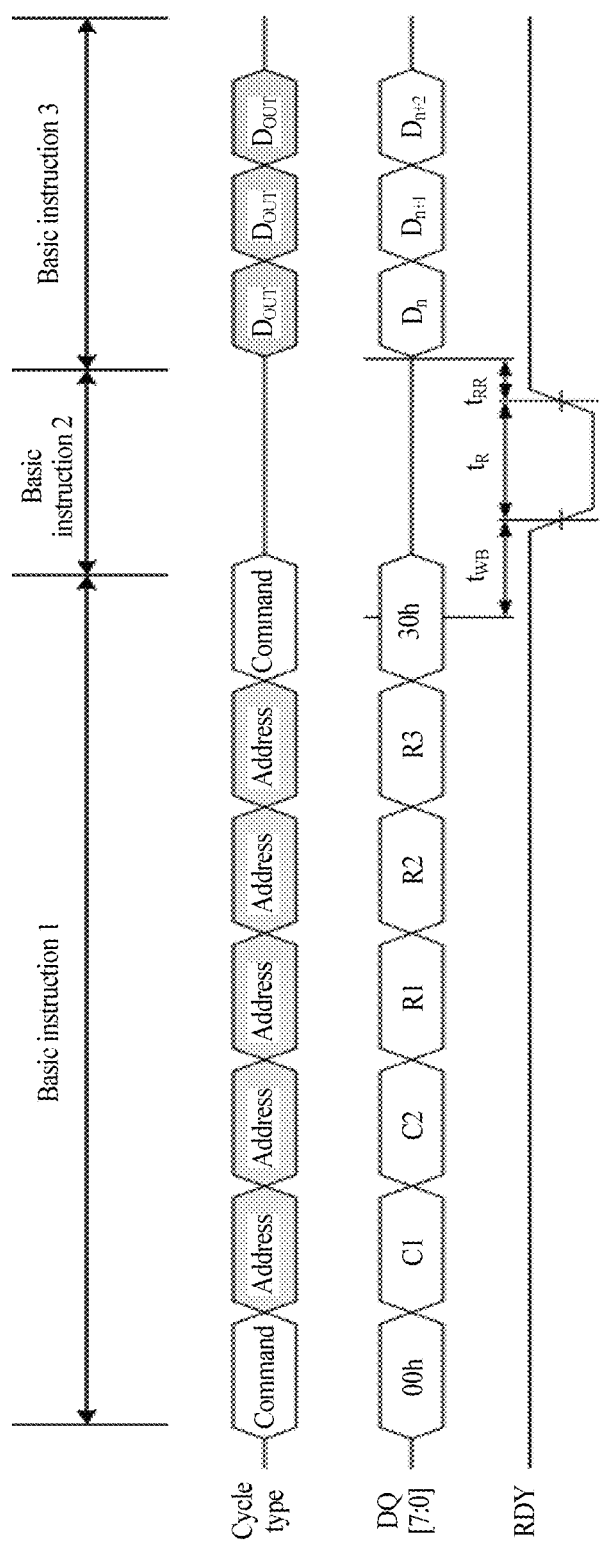
FIG. 3 is a schematic diagram of a principle of an operation instruction division method according to an embodiment of the present disclosure.

For example, referring to FIG. 3, a read operation instruction is a page read instruction. The controller divides the page read instruction into three basic instructions according to a preset mapping relationship. A basic instruction 1 is to send a read command, a basic instruction 2 is to check a status register, and a basic instruction 3 is to transmit data.

Step 204. The controller determines, from N function queues, a function queue associated with an access address.

Further, an address range is allocated to each of the N dies connected to the controller. The N function queues are in a one-to-one mapping relationship with the N dies. Therefore, each function queue corresponds to one address range. The controller determines an address range that is in N address ranges and in which the access address carried in the operation instruction is located. In this way, the controller may determine the function queue associated with the access address from the N function queues.

For example, an address range of the die 0 is [a, b], and the die 0 is associated with the function queue 0. An address range of the die 1 is [c, d], and the die 1 is associated with the function queue 1. An address range of the die 2 is [e, f], and the die 2 is associated with the function queue 2. An address range of the die 3 is [g, h], and the die 3 is associated with the function queue 3. Assuming that the access address carried in the operation instruction is located in the address range [a, b], the controller determines that the associated function queue is the function queue 0.

Step 205. The controller places the at least two basic instructions in the associated function queue.

Further, the controller may successively place, in a first in first out sequence, the at least two basic instructions obtained by means of division in step 203 on a queue tail of the associated function queue.

In a possible implementation, the controller may maintain a record table. The record table stores an entry that indicates a quantity of basic instructions currently stored in each function queue. When the controller detects that a quantity of basic instructions in a specific function queue among the N function queues is updated, the controller updates an entry of the function queue in the record table.

Step 206. The controller selects, in descending order of priorities, a non-empty function queue from the N function queues each time as a target function queue.

Further, priorities are preconfigured for the N function queues. The controller selects a non-empty function queue from the N function queues each time as the target function queue.

For example, the controller selects the target function queue from the N function queues in descending order of priorities. It is assumed that a priority of the function queue 0 is 4, a priority of the function queue 1 is 2, a priority of the function queue 2 is 1, and a priority of the function queue 3 is 3. All dies associated with the four function queues are in an idle state. According to a preset selection rule, the controller selects the function queue 0 as the target function queue for the first time, selects the function queue 3 as the target function queue for the second time, selects the function queue 1 as the target function queue for the third time, and selects the function queue 2 as the target function queue for the fourth time.

Optionally, in a possible implementation of the present disclosure, a method for selecting the target function queue by the controller is that the controller randomly selects a non-empty function queue associated with an idle die from the N function queues each time as the target function queue.

Optionally, in a possible implementation of the present disclosure, a method for selecting the target function queue by the controller is that the controller selects, in ascending or descending order of queue IDs, a non-empty function queue associated with an idle die from the N function queues each time as the target function queue.

Step 207. The controller obtains a basic instruction from the target function queue.

Further, the controller obtains a basic instruction from a queue head of the target function queue, and a basic instruction after the obtained basic instruction is a new queue head. When a quantity of basic instructions stored in the target function queue changes, the controller updates an entry that is of the target function queue and that is in the record table.

Step 208. The controller determines, according to preset queue mapping information, a die associated with the target function queue.

Step 209. The controller obtains an identifier of the basic instruction.

Further, the controller may obtain the identifier of the instruction from a specified field according to the basic instructions obtained in step 203. Different types of basic instructions correspond to different identifiers.

Step 210. The controller queries, according to a preset signal generation rule, clock cycle quantity information and level status information associated with the identifier of the basic instruction.

Further, the clock cycle quantity information indicates a quantity of to-be-output clock cycles. Quantities of clock cycles corresponding to different types of basic instructions may be equal, or may be unequal. The level status information indicates a level status of a specified pin in each to-be-output clock cycle. A quantity of level statuses is equal to the quantity of to-be-output clock cycles.

Step 211. The controller generates a time sequence signal according to the clock cycle quantity information and the level status information.

Further, each time a clock cycle arrives, the controller outputs, on a specified pin according to the level status information, a level status corresponding to the clock cycle, until level statuses are output on specified pins in all clock cycles.

Figure 4:
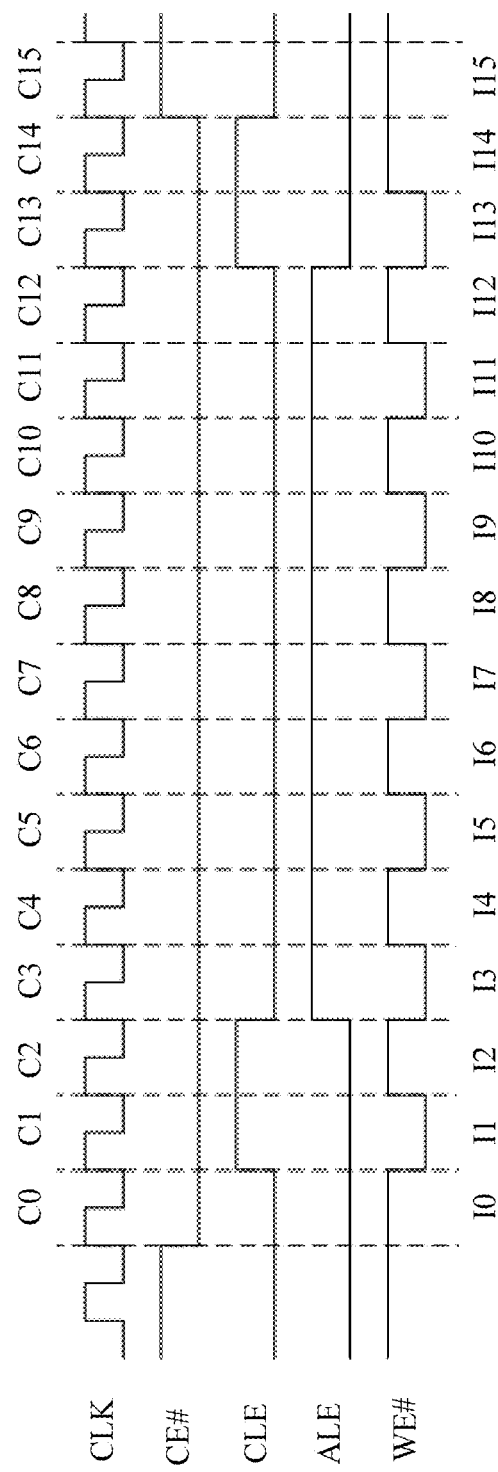
FIG. 4 is a schematic diagram of a principle of a time sequence signal generation method according to an embodiment of the present disclosure.

For example, referring to FIG. 4, FIG. 4 is a diagram of a waveform of a time sequence signal corresponding to a specific basic instruction. Clock cycle quantity information and level status information of the basic instruction are shown in Table 3. . C0 to C15 indicate sequence numbers of clock cycles. The time sequence signal of the basic instruction lasts for 16 clock cycles. I0 to I15 indicate level statuses that are of specified pins and that are corresponding to the clock cycles. The specified pins are, a CE# pin, a CLE pin, an ALE pin, and a WE# pin. A level status of each pin may be a high electrical level or a low electrical level, or may be a rising edge or a falling edge. In a possible implementation, a pin of a flash medium and a function of the pin may be as follows.

1. CLK: a clock pin, used for outputting a clock cycle.
2. CLE (Command Latch Enable): Before a command is input, CLE enable needs to be set in a mode register.
3. ALE (Address Latch Enable): Before an address is input, ALE enable needs to be set in a mode register.
4. CE# (Chip Enable): Before a NAND flash is operated, the operation can be performed after a chip is selected first.
5. RE# (Read Enable): Before data is read, the RE# needs to take effect first.
6. WE# (Write Enable): Before data is written, the WE# needs to take effect first.
7. WP# (Write Protection).
8. R/B# (Ready/Busy Output): Mainly used for detecting, after a program/erase command is sent, whether these operations are completed, where busy indicates that the program/erase operation is still being executed, and ready indicates that the operation is completed.
9. Vcc (Power).
10. Vss (Ground).
11. NC (Non-Connection).

In FIG. 4, the clock cycle quantity information queried by the controller according to the basic instruction is 16. The controller needs to output 16 clock cycles C0 to C15 to execute the basic instruction. The level status information is I0 to I15. When outputting the clock cycle C0, the controller finds, by means of query, that I0 indicates that level statuses of specified pins are as follows. A low electrical level is output on the CE# pin, a low electrical level is output on the CLE pin, a low electrical level is output on the ALE pin, a high electrical level is output on the WE# pin, and a high electrical level is output on a DQ pin. When outputting a clock cycle C1, the controller finds, by means of query, that I1 indicates that level statuses of specified pins are as follows. A low electrical level is output on the CE# pin, a high electrical level is output on the CLE pin, a low electrical level is output on the ALE pin, and a low electrical level is output on the WE# pin. The controller outputs a time sequence signal on a specified pin in the foregoing manner, until all the clock cycles end.

TABLE 3

| Clock cycle | Level status |
|---|---|
| C0 | I0 |
| C1 | I1 |
| C2 | I2 |
| C3 | I3 |
| C4 | I4 |
| C5 | I5 |
| C6 | I6 |
| C7 | I7 |
| C8 | I8 |
| C9 | I9 |
| C10 | I10 |
| C11 | I11 |
| C12 | I12 |
| C13 | I13 |
| C14 | I14 |
| C15 | I15 |

Each time a clock cycle arrives, the controller queries an associated level status according to a sequence number of the clock cycle, and outputs a corresponding high electrical level or low electrical level on a specified pin according to the level status.

Step 212. The controller sends, using a specified pin, the time sequence signal to a flash medium in which the associated die is located.

Further, the controller may query, according to prestored flash mapping information, the flash medium in which the associated die is located, and the controller sends the time sequence signal to the flash medium using the specified pin.

In a possible implementation of the present disclosure, that the controller generates, according to a preset signal generation rule, a time sequence signal corresponding to the basic instruction, and sends the time sequence signal to a flash medium in which the associated die is located includes the controller obtains an identifier of the basic instruction, the controller queries output sequence information and at least one type of pin level status information associated with the identifier of the basic instruction, where the pin level status information indicates a level status of a specified pin in a clock cycle, and the output sequence information indicates an arrangement sequence of the at least one type of pin level status information, the controller generates the time sequence signal according to the at least one type of pin level status information and the output sequence information, and the controller sends, using a specified pin, the time sequence signal to the flash medium in which the associated die is located.

Further, the pin level status information indicates a level status that is output on a specified pin in a clock cycle, and the output sequence information indicates the arrangement sequence of the at least one type of pin level status information.

Figure 5:
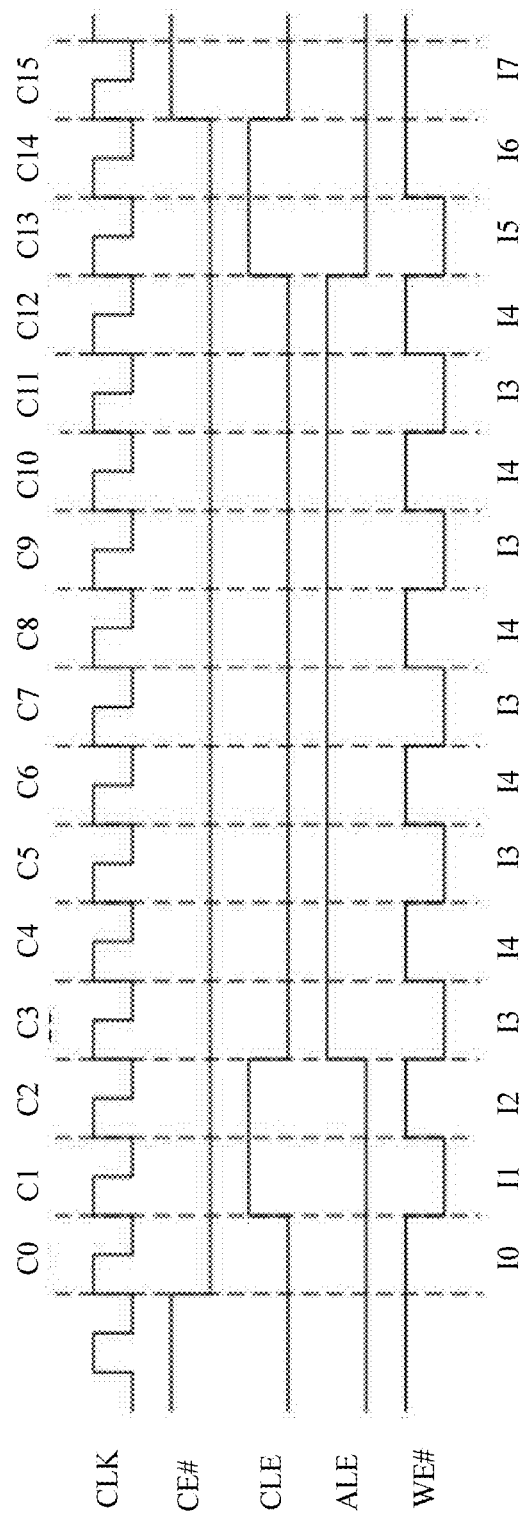
FIG. 5 is a schematic diagram of a principle of another time sequence signal generation method according to an embodiment of the present disclosure.

For example, referring to FIG. 5, the controller finds, by means of query, that pin level status information associated with the basic instruction is I0 to I7, that is, there are eight pieces of pin level status information. An arrangement sequence of I0 to I7 that is obtained according to queried output sequence information is: I0, I1, I2, I3, I4, I3, I4, I3, I4, I3, I4, I5, I6, I7, I3 and I4 are repeated four times after I2. When outputting a clock cycle C0, the controller finds, by means of query, that I0 indicates that level statuses of specified pins are as follows. A low electrical level is output on the CE# pin, a low electrical level is output on the CLE pin, a low electrical level is output on the ALE pin, a high electrical level is output on the WE# pin, and a high electrical level is output on the DQ pin. A method for outputting the time sequence signal subsequently is not described again. In this embodiment, pin level status information repeated multiple times may be indicated using an output sequence, and multiple groups of same pin level status information do not need to be stored such that information redundancy is reduced and storage space is reduced.

In the foregoing embodiment, when a controller selects a target function queue, the target function queue is a non-empty queue and a flash medium in which a die associated with the target function queue is located is in an idle state. In this way, different dies can parallely execute basic instructions sent by the controller in order to reduce an operation instruction execution time. In addition, a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

The methods in the embodiments of the present disclosure are described above in detail. For better implementation of the solutions in the embodiments of the present disclosure, apparatuses in the embodiments of the present disclosure are correspondingly provided in the following.

Figure 6A:
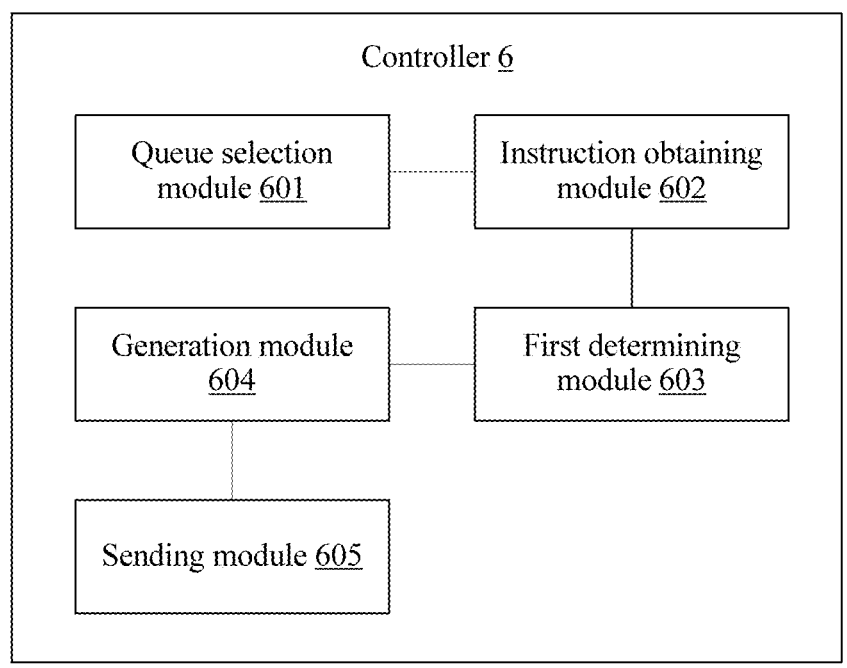
FIG. 6A is a schematic structural diagram of a controller according to an embodiment of the present disclosure.

Referring to FIG. 6A, FIG. 6A is a schematic structural diagram of a controller 6 according to an embodiment of the present disclosure. The controller 6 may include a queue selection module 601, an instruction obtaining module 602, a first determining module 603, a generation module 604, and a sending module 605. Detailed descriptions of the modules are as follows.

The queue selection module 601 is configured to select a target function queue from N function queues. The target function queue is a non-empty queue, a flash medium in which a die associated with the target function queue is located is in an idle state, and N is an integer greater than 1.

The instruction obtaining module 602 is configured to obtain a basic instruction from the target function queue.

the first determining module 603 is configured to determine, according to preset queue mapping information, the die associated with the target function queue. The controller is connected to at least one flash medium, each of the at least one flash medium includes at least one die, a quantity of dies connected to the controller is N, and the queue mapping information indicates a mapping relationship between the N function queues and the N dies.

The generation module 604 is configured to generate, according to a preset signal generation rule, a time sequence signal corresponding to the basic instruction.

The sending module 605 is configured to send the time sequence signal to the flash medium in which the associated die is located.

In the foregoing embodiment, when a controller selects a target function queue, the target function queue is a non-empty queue and a flash medium in which a die associated with the target function queue is located is in an idle state. In this way, different dies can parallely execute basic instructions sent by the controller in order to reduce an operation instruction execution time. In addition, a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

It should be noted that, in this embodiment of the present disclosure, for specific implementation of the modules, further refer to corresponding descriptions of the method embodiment shown in FIG. 1.

Figure 6B:
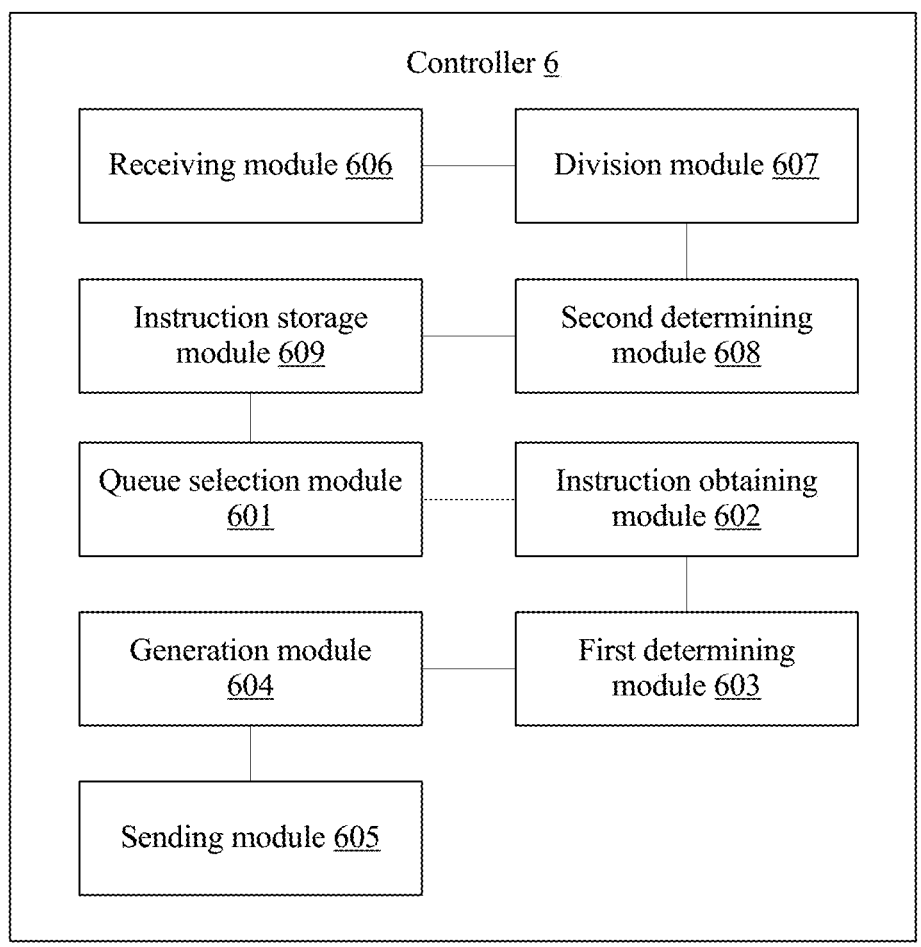
FIG. 6B is a schematic structural diagram of another controller according to an embodiment of the present disclosure.
Figure 7:
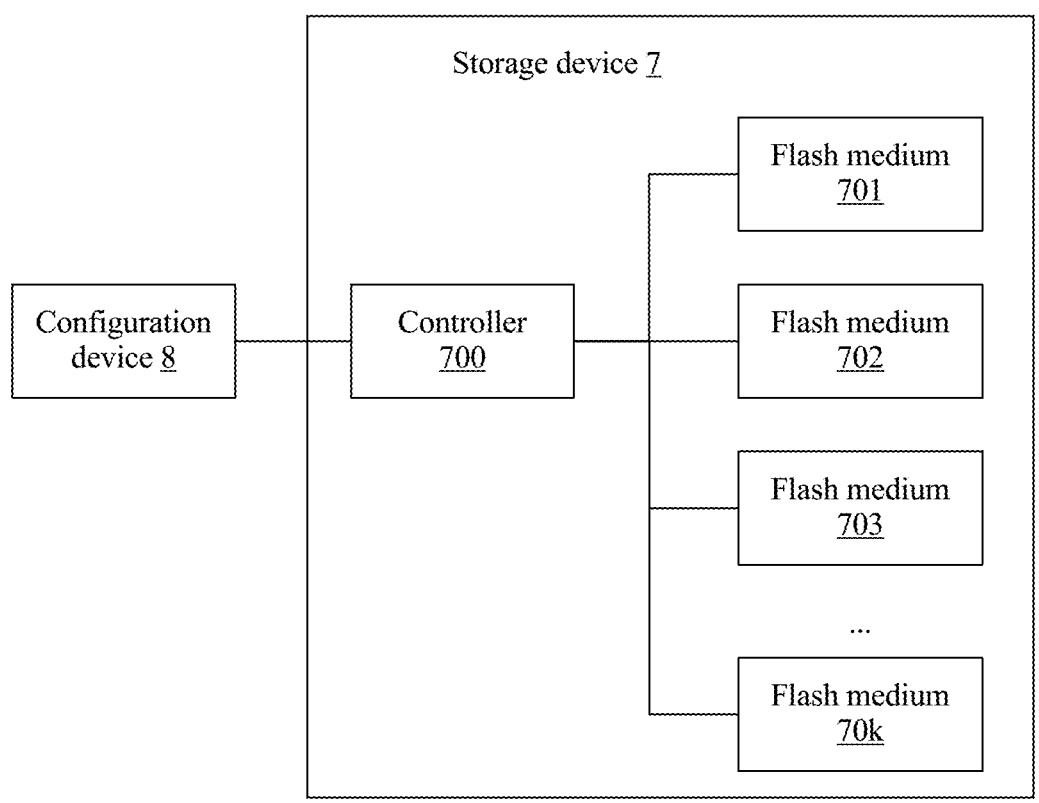
FIG. 7 is a schematic structural diagram of a system according to an embodiment of the present disclosure.

Referring to FIG. 6B, FIG. 6B is a schematic structural diagram of another controller 6 according to an embodiment of the present disclosure. In addition to the queue selection module 601, the instruction obtaining module 602, the first determining module 603, the generation module 604, and the sending module 605, the controller 6 may further include a receiving module 606, a division module 607, a second determining module 608, and an instruction storage module 609. Detailed descriptions of the modules are as follows.

The receiving module 606 is configured to receive an operation instruction, and the operation instruction carries an access address.

The division module 607 is configured to divide the operation instruction into at least two basic instructions.

The second determining module 608 is configured to determine a function queue associated with the access address from the N function queues.

The instruction storage module 609 is configured to place the at least two basic instructions in the associated function queue.

Optionally, the generation module 604 is further configured to obtain an identifier of the basic instruction, query output sequence information and at least one type of pin level status information associated with the identifier of the basic instruction, where the pin level status information indicates a level status of a specified pin in a clock cycle, and the output sequence information indicates an output sequence of the at least one type of pin level status information, and generate the time sequence signal according to the at least one type of pin level status information and the output sequence information.

Optionally, the generation module 604 is further configured to obtain an identifier of the basic instruction, query, according to the preset signal generation rule, clock cycle quantity information and level status information associated with the identifier of the basic instruction, where the clock cycle quantity information indicates a quantity of to-be-output clock cycles, and the level status information indicates a level status of a specified pin in each of the to-be-output clock cycles, and generate the time sequence signal according to the clock cycle quantity information and the level status information.

Optionally, the second determining module 608 is further configured to determine a target die according to an address range of the access address, and determine, according to the queue mapping information, a function queue associated with the target die, where the target die is one of N dies connected to the controller, and each of the N dies corresponds to one address range.

Optionally, the queue selection module 601 is further configured to select, in descending order of priorities, a non-empty function queue from the N function queues each time as the target function queue, or randomly select a non-empty function queue from the N function queues each time as the target function queue, or select, in ascending or descending order of queue IDs, a non-empty function queue from the N function queues each time as the target function queue.

It should be noted that, in this embodiment of the present disclosure, for specific implementations of the units, further refer to corresponding descriptions of the method embodiment shown in FIG. 2A and FIG. 2B.

The controller 6 may be implemented using an application-specific integrated circuit (ASIC) or a programmable logic device (PLD). The PLD may be a complex PLD (CPLD), a field-programmable gate array (FPGA), or generic array logic (GAL), or a combination thereof. The controller 6 is configured to implement the flash medium access method shown in FIG. 1. When the flash medium access method shown in FIG. 1 is implemented using software, the controller 6 and the modules of the controller 6 may also be software modules, such as software modules used to implement a NAND flash controller.

In the foregoing embodiment, when a controller selects a target function queue according to a predefined rule, the target function queue is a non-empty queue and a flash medium in which a die associated with the target function queue is located is in an idle state. In this way, different dies can parallelly execute basic instructions sent by the controller in order to reduce an operation instruction execution time. In addition, a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

The method and the apparatus in the embodiments of the present disclosure are described above in detail. For better implementation of the solutions in the embodiments of the present disclosure, a system in the embodiments of the present disclosure is correspondingly provided in the following.

The system includes a configuration device 8 and a storage device 7. The storage device 7 includes a controller 700 and k flash mediums a flash medium 701 to a flash medium 70 k, where k is an integer greater than 0. Each of the k flash mediums includes at least one die.

In the foregoing system, the configuration device 8 is adapted to configure queue mapping information and a signal generation rule, and send the queue mapping information and the signal generation rule to the controller 700. The configured information may be stored in a register group or a cache of the controller 700. The controller 700 is configured to select a target function queue from N function queues each time. The target function queue is a non-empty queue, a flash medium in which a die corresponding to the target function queue is located is in an idle state, and N is an integer greater than 1. The controller 700 obtains a basic instruction from the target function queue. The controller 700 determines, according to preset queue mapping information, the die associated with the target function queue. The queue mapping information indicates that the N function queues are in a one-to-one mapping relationship with the N dies. The controller 700 generates, according to a preset signal generation rule, a time sequence signal corresponding to the basic instruction, and sends the time sequence signal to the flash medium in which the associated die is located. The flash medium in which the associated die is located is one of the k flash mediums. The flash medium in which the associated die is located is configured to receive the time sequence signal, and perform a corresponding operation.

In the foregoing embodiment, when a controller selects a target function queue, the target function queue is a non-empty queue and a flash medium in which a die associated with the target function queue is located is in an idle state. In this way, different dies can parallelly execute basic instructions sent by the controller in order to reduce an operation instruction execution time. In addition, a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

Figure 8:
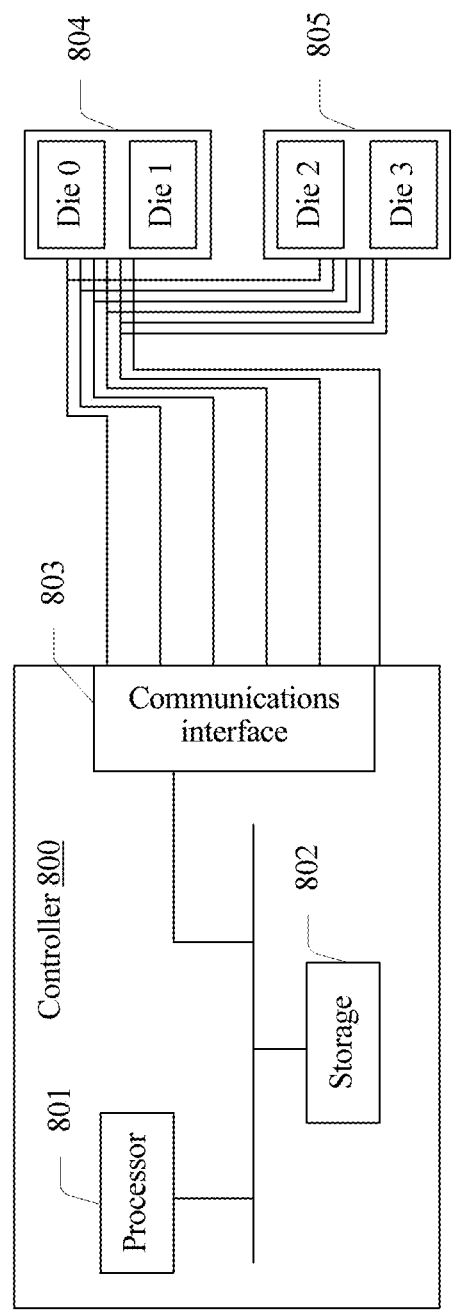
FIG. 8 is a schematic structural diagram of still another controller according to an embodiment of the present disclosure.

Referring to FIG. 8, FIG. 8 is a schematic structural diagram of a controller according to an embodiment of the present disclosure. In this embodiment of the present disclosure, a controller 800 includes a processor 801, a storage 802, and a communications interface 803. The communications interface 803 is configured to be connected to at least one flash medium. Each flash medium includes at least one die. When there is more than one flash medium, the controller 800 may be connected to multiple flash mediums in parallel using the communications interface 803. The communications interface 803 may be an ONFI or a toggle interface. For example, in FIG. 8, the controller 800 is connected to two flash mediums, a flash medium 804 and a flash medium 805. In a specific embodiment, a quantity of flash mediums connected to the controller 800 and a quantity of dies included in a flash medium are not limited thereto. There may be one or more processors 801 in the controller 800. In some embodiments of the present disclosure, the processor 801, the storage 802, and the communications interface 803 may be connected using a bus system or in another manner. The processor 801, the storage 802, and the communications interface 803 may be connected in a wired manner, or may communicate with each other by means of wireless transmission or by another means. The controller 800 may be configured to perform the method shown in FIG. 1. For meanings and examples of terms in in this embodiment, refer to the embodiment corresponding to FIG. 1. Details are not described herein.

The storage 802 stores program code. The processor 801 is configured to invoke the program code stored in the storage 802 in order to execute the following operations of selecting a target function queue from N function queues, where the target function queue is a non-empty queue, a flash medium in which a die associated with the target function queue is located is in an idle state, and N is an integer greater than 1, obtaining a basic instruction from the target function queue, determining, according to preset queue mapping information, the die associated with the target function queue, where the controller is connected to at least one flash medium, each of the at least one flash medium includes at least one die, a quantity of dies connected to the controller is N, and the queue mapping information indicates a mapping relationship between the N function queues and the N dies, generating, according to a preset signal generation rule, a time sequence signal corresponding to the basic instruction, and sending the time sequence signal to the flash medium in which the associated die is located.

Optionally, that the processor 801 generates, according to the preset signal generation rule, the time sequence signal corresponding to the basic instruction includes obtaining an identifier of the basic instruction, querying output sequence information and at least one type of pin level status information associated with the identifier of the basic instruction, where the pin level status information indicates a level status of a specified pin in a clock cycle, and the output sequence information indicates an output sequence of the at least one type of pin level status information, and generating the time sequence signal according to the at least one type of pin level status information and the output sequence information.

Optionally, that the processor 801 generates, according to the preset signal generation rule, the time sequence signal corresponding to the basic instruction includes obtaining an identifier of the basic instruction, querying, according to the preset signal generation rule, clock cycle quantity information and level status information associated with the identifier of the basic instruction, where the clock cycle quantity information indicates a quantity of to-be-output clock cycles, and the level status information indicates a level status of a specified pin in each of the to-be-output clock cycles, and generating the time sequence signal according to the clock cycle quantity information and the level status information.

Optionally, the processor 801 is further configured to receive an operation instruction, where the operation instruction carries an access address, divide the operation instruction into at least two basic instructions, determine a function queue associated with the access address from the N function queues, and place the at least two basic instructions in the associated function queue.

Optionally, that the processor 801 determines the function queue associated with the access address from the N function queues includes determining a target die according to an address range of the access address, and determining, according to the queue mapping information, a function queue associated with the target die, where the target die is one of N dies connected to the controller, and each of the N dies corresponds to one address range.

Optionally, that the processor 801 selects the target function queue from the N function queues each time according to a predefined rule includes selecting, in descending order of priorities, a non-empty function queue from the N function queues each time as the target function queue, or randomly selecting a non-empty function queue from the N function queues each time as the target function queue, or selecting, in ascending or descending order of queue IDs, a non-empty function queue from the N function queues each time as the target function queue.

In conclusion, according to the embodiments of the present disclosure, when a controller selects a target function queue, the target function queue is a non-empty queue and a flash medium in which a die associated with the target function queue is located is in an idle state. In this way, different dies can parallelly execute basic instructions sent by the controller in order to improve operation instruction execution efficiency. In addition, a waveform of a time sequence signal corresponding to the basic instruction is generated according to a preset signal generation rule. In this way, different types of flash mediums can be matched by configuring signal generation rules corresponding to the different types of flash mediums such that compatibility between the controller and the flash mediums is improved.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium includes any medium that can store program code, such as a read-only memory (ROM), a random access memory (RAM), a magnetic disk, or an optical disc.

The foregoing embodiments disclose merely examples of embodiments of the present disclosure, but are not intended to limit the protection scope of the present disclosure. A person of ordinary skill in the art may understand that all or some of processes that implement the foregoing embodiments and equivalent modifications made according to the claims of the present disclosure shall fall within the scope of the present disclosure.

What is claimed is:

1. A flash medium access method, comprising:
selecting, by a controller, a target function queue from a plurality of function queues by randomly selecting a non-empty function queue from the function queues each time as the target function queue, wherein a flash medium in which a die associated with the target function queue is located is in an idle state, wherein the controller is coupled to at least one flash medium, wherein each of the at least one flash medium comprises at least one die, and wherein a number of the function queues is a same as a number of dies in each flash medium;
obtaining, by the controller, a basic instruction from the target function queue;
identifying, by the controller according to queue mapping information, the die associated with the target function queue, wherein the queue mapping information indicates a mapping relationship between the function queues and the dies;
generating, by the controller according to a signal generation rule, a time sequence signal corresponding to the basic instruction; and
sending, by the controller, the time sequence signal to the flash medium in which the associated die is located.

2. The flash medium access method of claim 1, wherein generating the time sequence signal corresponding to the basic instruction comprises:
obtaining, by the controller, an identifier of the basic instruction;
querying, by the controller according to the signal generation rule, output sequence information and at least one type of pin level status information associated with the identifier of the basic instruction, wherein the pin level status information indicates a level status of a specified pin in a clock cycle, wherein the output sequence information indicates an output sequence of the at least one type of the pin level status information, and wherein the specified pin is a control pin on the controller; and
generating, by the controller, the time sequence signal according to the at least one type of the pin level status information and the output sequence information.

3. The flash medium access method of claim 1, wherein generating the time sequence signal corresponding to the basic instruction comprises:
obtaining, by the controller, an identifier of the basic instruction;
querying, by the controller according to a preset signal generation rule, clock cycle quantity information and level status information associated with the identifier of the basic instruction, wherein the clock cycle quantity information indicates a quantity of to-be-output clock cycles, and wherein the level status information indicates a level status of a specified pin in each of the to-be-output clock cycles; and
generating, by the controller, the time sequence signal according to the clock cycle quantity information and the level status information.

4. The flash medium access method of claim 1, wherein before selecting the target function queue from the function queues, the flash medium access method further comprises:

receiving, by the controller, an operation instruction from a solid state drive controller, wherein the operation instruction carries an access address;
dividing, by the controller, the operation instruction into at least two basic instructions;
identifying, by the controller from the function queues, a function queue associated with the access address; and
placing, by the controller, the at least two basic instructions in the associated function queue.

5. The flash medium access method of claim 4, wherein identifying the function queue associated with the access address comprises:
identifying a target die according to an address range of the access address, wherein each of the dies corresponds to one address range; and
identifying, according to the queue mapping information, a function queue associated with the target die, wherein the target die is one of the dies coupled to the controller.

6. The flash medium access method of claim 1, wherein the controller is communicatively coupled to a plurality of different flash mediums, and wherein the different flash mediums are from different manufacturers.

7. The flash medium access method of claim 6, wherein the different flash mediums comprise different modes, speeds, commands, and protocols.

8. A controller, comprising:
a memory configured to store a plurality of instructions; and
a processor coupled to the memory, wherein the instructions cause the processor to be configured to:
select a target function queue from a plurality of function queues by randomly selecting a non-empty function queue from the function queues each time as the target function queue, wherein a flash medium in which a die associated with the target function queue is located is in an idle state, wherein the controller is coupled to at least one flash medium, wherein each of the at least one flash medium comprises at least one die, and wherein a number of the function queues is a same as a number of dies;
obtain a basic instruction from the target function queue;
identify, according to queue mapping information, the die associated with the target function queue, wherein the queue mapping information indicates a mapping relationship between the function queues and the dies;
generate, according to a signal generation rule, a time sequence signal corresponding to the basic instruction; and
send the time sequence signal to the flash medium in which the associated die is located.

9. The controller of claim 8, wherein the instructions further cause the processor to be configured to:
obtain an identifier of the basic instruction;
query, according to the signal generation rule, output sequence information and at least one type of pin level status information associated with the identifier of the basic instruction, wherein the pin level status information indicates a level status of a specified pin in a clock cycle, wherein the output sequence information indicates an output sequence of the at least one type of the pin level status information, and wherein the specified pin is a control pin on the controller; and
generate the time sequence signal according to the at least one type of the pin level status information and the output sequence information.

10. The controller of claim 8, wherein the instructions further cause the processor to be configured to:
obtain an identifier of the basic instruction;
query, according to a preset signal generation rule, clock cycle quantity information and level status information associated with the identifier of the basic instruction, wherein the clock cycle quantity information indicates a quantity of to-be-output clock cycles, and wherein the level status information indicates a level status of a specified pin in each of the to-be-output clock cycles; and
generate the time sequence signal according to the clock cycle quantity information and the level status information.

11. The controller of claim 8, wherein the instructions further cause the processor to be configured to:
receive an operation instruction from a solid state drive controller, wherein the operation instruction carries an access address;
divide the operation instruction into at least two basic instructions;
identify, from the function queues, a function queue associated with the access address; and
place, the at least two basic instructions in the associated function queue.

12. The controller of claim 11, wherein the instructions further cause the processor to be configured to:
identify a target die according to an address range of the access address, wherein each of the dies corresponds to one address range; and
identify, according to the queue mapping information, a function queue associated with the target die, wherein the target die is one of the dies coupled to the controller.

13. The controller of claim 8, wherein the controller is communicatively coupled to a plurality of different flash mediums, and wherein the different flash mediums are from different manufacturers.

14. The controller of claim 13, wherein the different flash mediums comprise different modes, speeds, commands, and protocols.

15. A computer-readable storage medium comprising instructions which, when executed by a computer, cause the computer to:
select a target function queue from a plurality of function queues by randomly selecting a non-empty function queue from the function queues each time as the target function queue, wherein a flash medium in which a die associated with the target function queue is located is in an idle state, wherein a controller is coupled to at least one flash medium, wherein each of the at least one flash medium comprises at least one die, and wherein a number of function queues is a same as a number of dies;
obtain a basic instruction from the target function queue;
identify, according to queue mapping information, the die associated with the target function queue, wherein the queue mapping information indicates a mapping relationship between the function queues and the dies;
generate, according to a signal generation rule, a time sequence signal corresponding to the basic instruction; and
send the time sequence signal to the flash medium in which the associated die is located.

16. The computer-readable storage medium of claim 15, wherein the instructions further cause the computer to:
obtain an identifier of the basic instruction;
query, according to the signal generation rule, output sequence information and at least one type of pin level status information associated with the identifier of the basic instruction, wherein the pin level status information indicates a level status of a specified pin in a clock cycle, wherein the output sequence information indicates an output sequence of the at least one type of the pin level status information, and wherein the specified pin is a control pin on the controller; and
generate the time sequence signal according to the at least one type of the pin level status information and the output sequence information.

17. The computer-readable storage medium of claim 15, wherein the instructions further cause the computer to:
obtain an identifier of the basic instruction;
query, according to a preset signal generation rule, clock cycle quantity information and level status information associated with the identifier of the basic instruction, wherein the clock cycle quantity information indicates a quantity of to-be-output clock cycles, and wherein the level status information indicates a level status of a specified pin in each of the to-be-output clock cycles; and
generate the time sequence signal according to the clock cycle quantity information and the level status information.

18. The computer-readable storage medium of claim 15, wherein the instructions further cause the computer to:
receive an operation instruction from a solid state drive controller, wherein the operation instruction carries an access address;
divide the operation instruction into at least two basic instructions;
identify, from the function queues, a function queue associated with the access address; and
place the at least two basic instructions in the associated function queue.

19. The computer-readable storage medium of claim 15, wherein the controller is communicatively coupled to a plurality of different flash mediums, and wherein the different flash mediums are from different manufacturers.

20. The computer-readable storage medium of claim 19, wherein the different flash mediums comprise different modes, speeds, commands, and protocols.

* * * * *